(12) United States Patent
Coker (10) Patent No.: US 7,752,231 B2
(45) Date of Patent: Jul. 6, 2010

(54) METHOD OF ENCAPSULATING INFORMATION IN A DATABASE, AN ENCAPSULATED DATABASE FOR USE IN A COMMUNICATION SYSTEM AND A METHOD BY WHICH A DATABASE MEDIATES AN INSTANT MESSAGE IN THE SYSTEM

(75) Inventor: Christopher B. A. Coker, Annandale, VA (US)

(73) Assignee: Encapsa Technology, LLC, Wilmington, DE (US)

( * ) Notice: Subject to any disclaimer, the term of this patent is extended or adjusted under 35 U.S.C. 154(b) by 480 days.

(21) Appl. No.: 11/477,533

(22) Filed: Jun. 30, 2006

(65) Prior Publication Data

US 2007/0011193 A1 Jan. 11, 2007

Related U.S. Application Data

(60) Provisional application No. 60/595,429, filed on Jul. 5, 2005.

(51) Int. Cl.
*G06F 17/30* (2006.01)
(52) U.S. Cl. ....................................................... 707/802
(58) Field of Classification Search ........................ None
See application file for complete search history.

(56) References Cited

U.S. PATENT DOCUMENTS

| | | | |
|---|---|---|---|
| 5,794,039 A | * | 8/1998 | Guck ...................... 707/103 R |
| 2002/0186692 A1 | * | 12/2002 | Chang et al. ................ 370/389 |
| 2003/0014477 A1 | * | 1/2003 | Oppenheimer et al. ...... 709/203 |

* cited by examiner

*Primary Examiner*—Mohammad Ali
*Assistant Examiner*—Syed H Hasan
(74) *Attorney, Agent, or Firm*—Charter IP LLC; Matthew J. Lattig (57) ABSTRACT

In a method of encapsulating information in a database, a message may be partitioned into a plurality of object class entries within the database. Each of the object class entries may constitute a portion of an object class from a plurality of object classes having a given hierarchy within the database. One or more pointers may be generated; the pointers point to at least one of the plurality of object class entries. The object class entries may be stored in non-adjacent storage locations within the database, with at least one of the plurality of object class entries stored in association with the generated at least one pointer such that the at least one pointer points to a higher-level object class entry, as determined by the object class hierarchy, than the at least one object class entry stored in association with the pointer.

17 Claims, 9 Drawing Sheets

METHOD OF ENCAPSULATING INFORMATION IN A DATABASE, AN ENCAPSULATED DATABASE FOR USE IN A COMMUNICATION SYSTEM AND A METHOD BY WHICH A DATABASE MEDIATES AN INSTANT MESSAGE IN THE SYSTEM

PRIORITY STATEMENT

This application claims the benefit under 35 U.S.C. §119(e) to U.S. Provisional Patent Application Ser. No. 60/595,429 by the inventor, filed Jul. 5, 2005 and entitled "DATABASE MEDIATED MESSAGING ", the entire contents of which is hereby incorporated by reference herein.

BACKGROUND OF THE INVENTION

1. Field of the Invention

Example embodiments of the present invention relate in general to a method a encapsulating information in a database of a communication system, an encapsulated database of the system, and to a method of mediating messaging in the communication system using the database.

2. Description of the Related Art

Conventional databases configured to store user-associated information typically employ a proprietary "record" format. A record includes a number of fields which are uniform throughout a particular database. Records typically include (1) fields used to authenticate or identify users, and (2) fields used to store data associated with the users.

In an example, identifying fields may include a "First Name" field, a "Last Name Field", a "Social Security Number" field, etc., and/or any other well-known identification/authentication signature (e.g., a biometric signature of a user's fingerprint, retinal scan, etc.). In another example, data fields may include "Credit History", "Medical History", etc., and/or any other well type of user-associated data.

Databases using the same record fields can communicate with each other with a standardized communication interface protocol (CIP). For example, first and second Oracle databases may all include the same, or at least compatible, record field structures. The first and second Oracle databases may share information, stored in their respective record fields, using an Oracle-specific CIP because the record field structure of the first and second Oracle databases is known at each database.

However, different databases typically include proprietary record field structures with potentially incompatible CIPs. For example, a non-Oracle database cannot be accessed using the Oracle-specific CIP unless the non-Oracle database employs a "translator" application which converts the Oracle-specific CIP to the non-Oracle CIP, and vice versa. Translator applications are expensive to produce and maintain, and add complexity to inter-database communications. Further, it can be difficult to detect whether another database employs a translator application capable of communication with a source database, such that successful communication cannot be guaranteed.

Record fields are typically stored together in contiguous or adjacent memory address locations, such that identifying fields and data fields are in close, physical proximity to each other within conventional databases. Accordingly, if a conventional database is compromised by a hacker, the hacker can, with relative ease, associate the identifying fields with their associated data fields to obtain the relevance of the data fields.

Conventional techniques to reduce a hacker's success in extracting relevance from compromised data (e.g., by correctly associating compromised data with user-information) typically include adding layers of "active" encryption to database storage protocols. For example, an entire database, storing numerous records, may be encrypted such that the hacker cannot read any information from the database without obtaining a key to decrypt the database.

However, authorized users must also decrypt the database to access the information stored therein, which adds additional processing requirements and delays to database access. Further, if the hacker is able to successfully decrypt the database, the information present within the database becomes available to the hacker in the conventional "ready-to-read" format (e.g., contiguous/adjacent memory address record field storage). Also, if an authorized user loses the key required to decrypt the encrypted database, the authorized user cannot access the database until he/she obtains a replacement key, which can be a laborious process (e.g., requiring re-authentication and distribution of the replacement key).

SUMMARY OF THE INVENTION

An example embodiment of the present invention is directed to a method of encapsulating information in a database. In the method, a message may be partitioned into a plurality of object class entries within the database. Each of the object class entries may constitute a portion of an object class from a plurality of object classes having a given hierarchy within the database. One or more pointers may be generated; the pointers point to at least one of the plurality of object class entries. The object class entries may be stored in non-adjacent storage locations within the database, with at least one of the plurality of object class entries stored in association with the generated at least one pointer such that the at least one pointer points to a higher-level object class entry, as determined by the object class hierarchy, than the at least one object class entry stored in association with the at least one pointer.

Another example embodiment of the present invention is directed to an encapsulated database for use in a communication system. The database may include a plurality of object class entries corresponding to given fields in a received message received from a given communication entity in the system. The message has been partitioned so that the fields are dedicated to corresponding object class entries. Each object class entry constitutes a portion of a given object class of a plurality of object classes having a given hierarchy. The database includes a plurality of pointers, each for pointing to one or more of the object class entries, and a plurality of storage locations. Each of the object class entries corresponding to the fields of the message are stored in non-adjacent storage locations. A given object class entry is stored in association with a given pointer such that the given pointer points to a higher-level object class entry, as determined by the object class hierarchy, than the given object class entry stored in association therewith.

Another example embodiment of the present invention is directed to a method by which a database mediates an instant message from a first user to a second user in a communication system. The second user is not logged into the database at the time the first user is logged into the database to send the instant message. In the method, the first user the instant message in accordance with a common communication interface protocol understood by the database and then sends the configured instant message to the database. The database encapsulates the received instant message. The encapsulating further includes partitioning the message into a plurality of object class entries within the database, each of the plurality of object class entries constituting a portion of an object class from a plurality of object classes having a given hierarchy within the database. The encapsulating further includes generating one or more pointers, each for pointing to one or more of the object class entries, and storing each of the plurality of object class entries in non-adjacent storage locations. A given object class entry is stored in association with a given pointer such that the given pointer points to a higher-level object class entry, as determined by the object class hierarchy, than the given object class entry stored in association therewith. In order to deliver the instant message to the second user, the database extracts the instant message based on one or more given object class entries matching an information request sent thereto by the second user.

Another example embodiment of the present invention is directed to communication system. The system includes a plurality of encapsulated databases for facilitating communication of a message between communication entities of the system which have access to the databases. Each database includes a plurality of object class entries corresponding to given fields in a received message. Each database includes a plurality of pointers, each for pointing to one or more of the object class entries.

The message, upon receipt from a first communication entity at a given database, is separated into hierarchical object class entries of object classes. The object classes are related to an organization source of the message, a sender of the message, a type of message sent, and content within the message. Each of the separate object class entries are stored in non-adjacent storage locations within the given database, with the hierarchical order from highest to lowest being organization, sender, type of message and content. A given object class entry is stored in association with a given pointer such that the given pointer points to a higher-level object class entry, as determined by an object class hierarchy, than the given object class entry stored in association therewith.

In this example, the type of message object class entries are maintained uniform in each of the databases of the system, so that a pairing of type-content object class entries provide a uniform search capability for desired information from the databases for an authorized second communication entity querying to retrieve the stored message sent from the first communication entity.

BRIEF DESCRIPTION OF THE DRAWINGS

Example embodiments of the present invention will become more fully understood from the detailed description given herein below and the accompanying drawings which are given by way of illustration only, wherein like reference numerals designate corresponding parts in the various drawings.

DETAILED DESCRIPTION OF THE EXAMPLE EMBODIMENTS

In order to better understand the present invention, an example communication system will be described, followed by examples of encapsulated databases and encapsulated database data mediation operations performed within the example system. Then, more detailed data mediation operations, including instant messaging between users, will be described in greater detail.

Example System

As discussed in the Background of the Invention, conventional databases typically store user records in contiguous or adjacent memory address locations. An example embodiment of the present invention is directed to an "encapsulated" database, which is characterized by non-contiguous or disparate storage of information such as user records or messages into "object classes". Terminology used to described the encapsulated database throughout the remainder of this application is defined as follows.

"Object Class"—An object class is one of a plurality of defined, hierarchical fields stored within the encapsulated database. As described herein, object classes include, in an order from highest-level to lowest-level within an object class hierarchy, object classes Folder, Form, Topic and Data.

Figure 1:
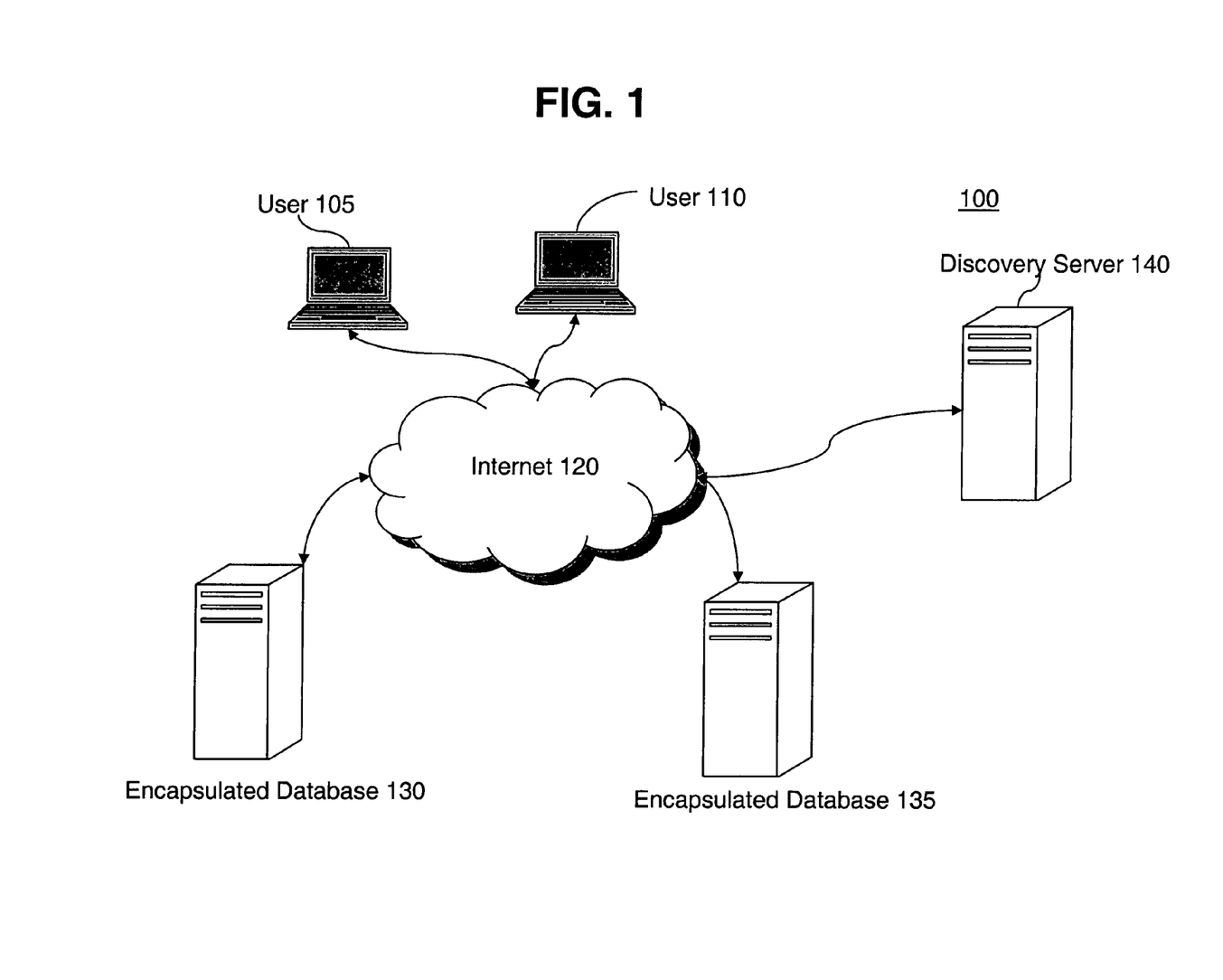
FIG. 1 illustrates a system according to an example embodiment of the present invention.

"Pointer"—A pointer is a link to a destination memory address. In an example, the pointer may be an actual, physical memory address. In another example, the pointer may be encoded with a key or algorithm, such that the key or algorithm is required to extract a physical memory address based at least in part on the pointer;

FIG. 1 illustrates a system 100 according to an example embodiment of the present invention. In FIG. 1, the system 100 includes users 105 and 110, an Internet 120, encapsulated databases 130 and 135 and a discovery server 140. Each of the users 105 and 110, the encapsulated databases 130 and 135 and the discovery server 140 are connected, and may access each other, through the Internet 120. In an example, the users 105 and 110 may be embodied as any well-known type of communication device, such as a desktop computer, a notebook computer or laptop, a PDA, a mobile phone, etc. In another example, the encapsulated databases 130/135 and the discovery server 140 may each be embodied as any type of storage server, such as an Oracle server, a mainframe computer, or a notebook/desktop computer configured to operate as a storage server. The discovery server 140 maintains a set of user "locations", or encapsulated database associations, for all users 105/110 "logged on" to one of the encapsulated database servers 130/135 and/or having an account maintained by one of the encapsulated database servers 130/135 (e.g., even if logged off).

Example embodiments of encapsulated databases and encapsulated database operations shall be hereinafter described with reference to the example system 100 of FIG. 1.

Building an Encapsulated Database

Figure 2:
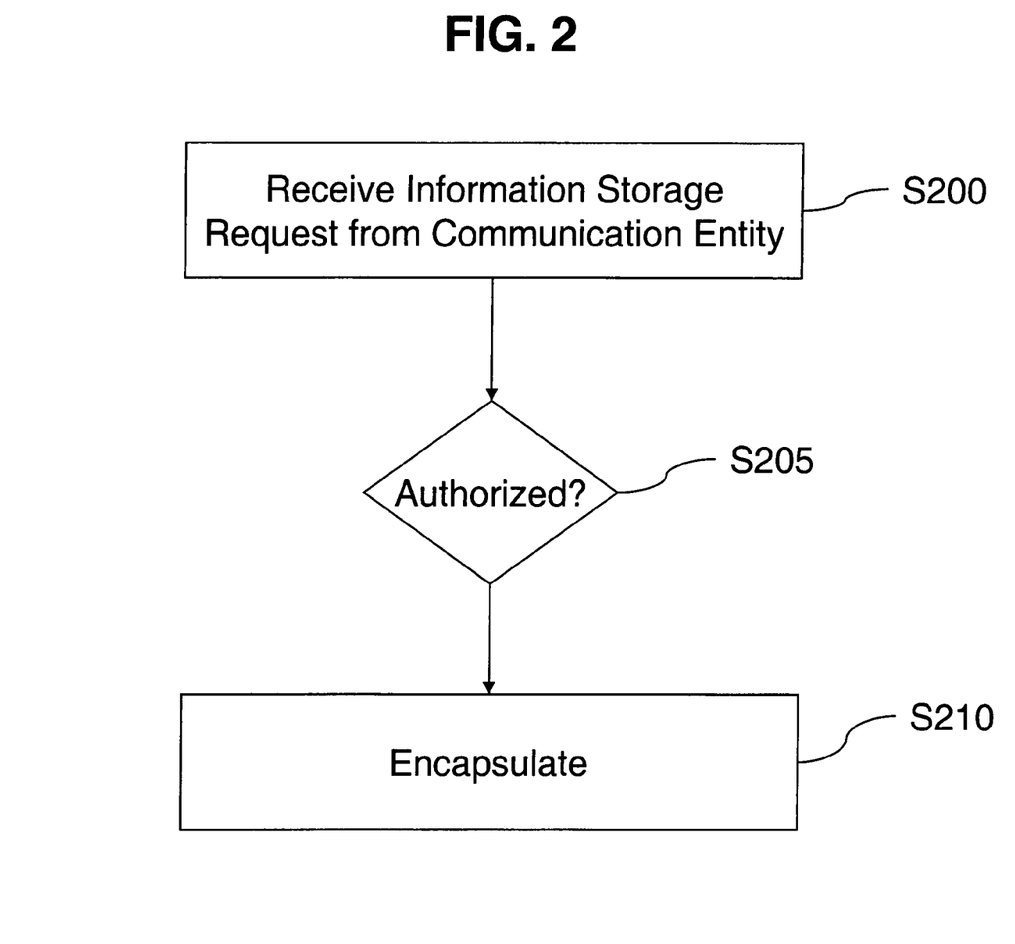
FIG. 2 illustrates a process for storing information within an encapsulated database according to an example embodiment of the present invention.

An example of "building" or uploading information to an encapsulated database (e.g., the encapsulated database 130) will now be described with reference to the system 100 of FIG. 1. FIG. 2 illustrates a process for storing information within the encapsulated database 130 according to an example embodiment of the present invention.

In the example embodiment of FIG. 2, the encapsulated database 130 receives a request to store information ("information storage request") in step S200. In an example, the information for which storage is requested within the encapsulated database 130 is included along with the request received in step S200. In an example, the communication entity may be any device capable of accessing the encapsulated database 130, either directly or indirectly. For example, the communication entity may be the user 105 sending the information storage request through the Internet 120.

In step S205, the encapsulated database 130 evaluates the communication entity and the information storage request to determine whether the communication entity is authorized to modify the object classes designated within the information storage request, so as to store the information in the message at the requested location within the encapsulated database 130. This authorization determination of step S205 may include several steps, as illustrated in FIG. 3.

Figure 3:
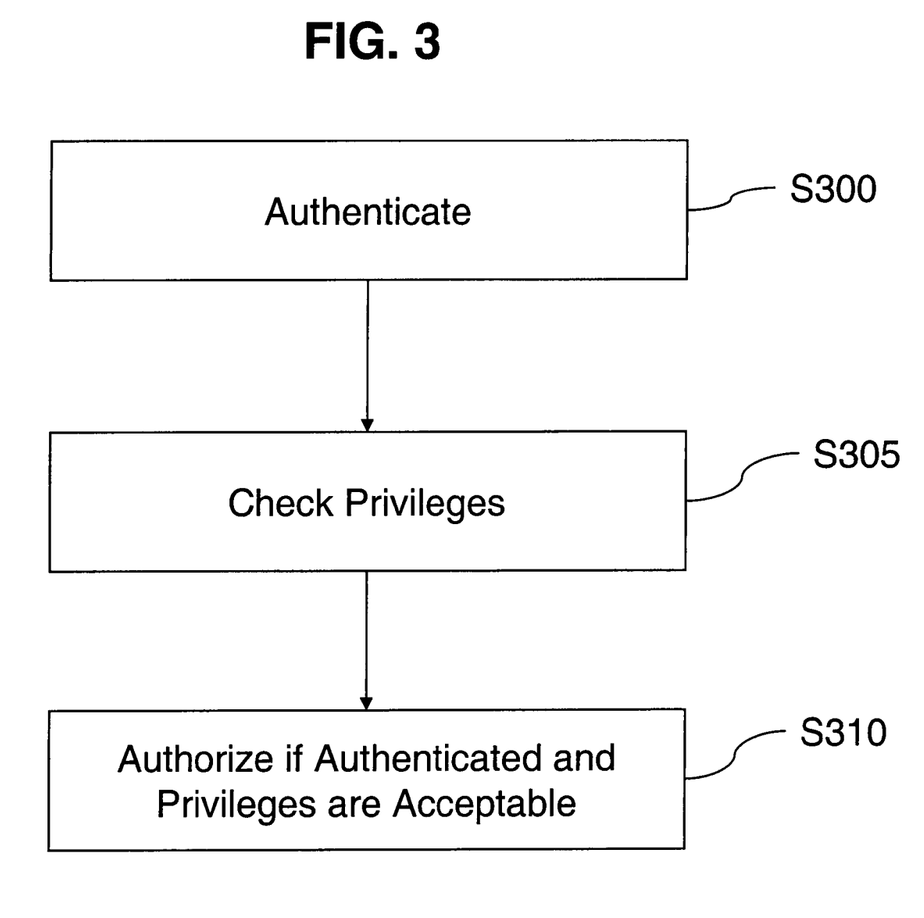
FIG. 3 illustrates a user authorization step according to another example embodiment of the present invention.

FIG. 3 illustrates the authorization step S205 of FIG. 2 in greater detail according to another example embodiment of the present invention. In the example embodiment of FIG. 3, the communication entity authenticates itself with the encapsulated database 130 in step S300. Any well-known authentication process may be employed by the encapsulated database 130 to authenticate the communication entity in step S300. For example, in step S300, the communication entity may be prompted to enter a password. In another example, the communication entity may be required to provide a digital certificate (e.g., obtained via a Diffie-Hellman key exchange) to authenticate itself. Alternatively, the authentication step S300 may be skipped if the communication entity has recently provided suitable authentication (e.g., the communication entity has already "logged on"). In an example, assuming password authentication, the communication entity may only be asked to re-authenticate itself (i.e., re-enter the password) in step S300 after a given time period from a previous, acceptable authentication (e.g., 30 minutes, 60 minutes, a day, etc.).

In step S305 of FIG. 3, the encapsulated database 130 compares the privilege level of the communication entity with the information storage request (from S200) to determine whether the communication entity has sufficient privileges to store the information at the requested location. The privilege level of the communication entity is maintained locally at the encapsulated database 130. For example, if the information storage request is an Instant Message (IM) from user 105 to user 110, the user 105 has adequate privileges to send the IM to user 110 if user 105 is present on an "Approved Sender's List" for user 110. In an example, employees within the same company, or the same team or division within a company, may automatically be approved for communication with each other. In another example, the user 110 may manually add user 105 to the "Approved Sender's List" to grant communication or storage privileges to user 105.

In step S310 of FIG. 3, the encapsulated database 130 determines whether to approve the information storage request (from S200) based on the results of steps S300 and S305. Step S310 approves or authorizes the information storage request if (1) step S300 authenticates the communication entity and (2) step S305 determines that the communication entity has sufficient privileges to store information in the requested storage location; otherwise, the information storage request is not authorized.

Returning to step S205 of FIG. 2, if the communication entity is not authorized to execute the information storage request (e.g., as determined from the process of FIG. 3), the information storage request is ignored and no action is taken by the encapsulated database 130 (e.g., other than, possibly, informing the communication entity that the information storage request has been denied). Otherwise, if the communication entity is determined to be authorized in step S205, the process advances to step S210. In step S210, the information sent by the communication entity for storage within the encapsulated database 130 is "encapsulated", which will now be described in greater detail with respect to FIG. 4.

Figure 4:
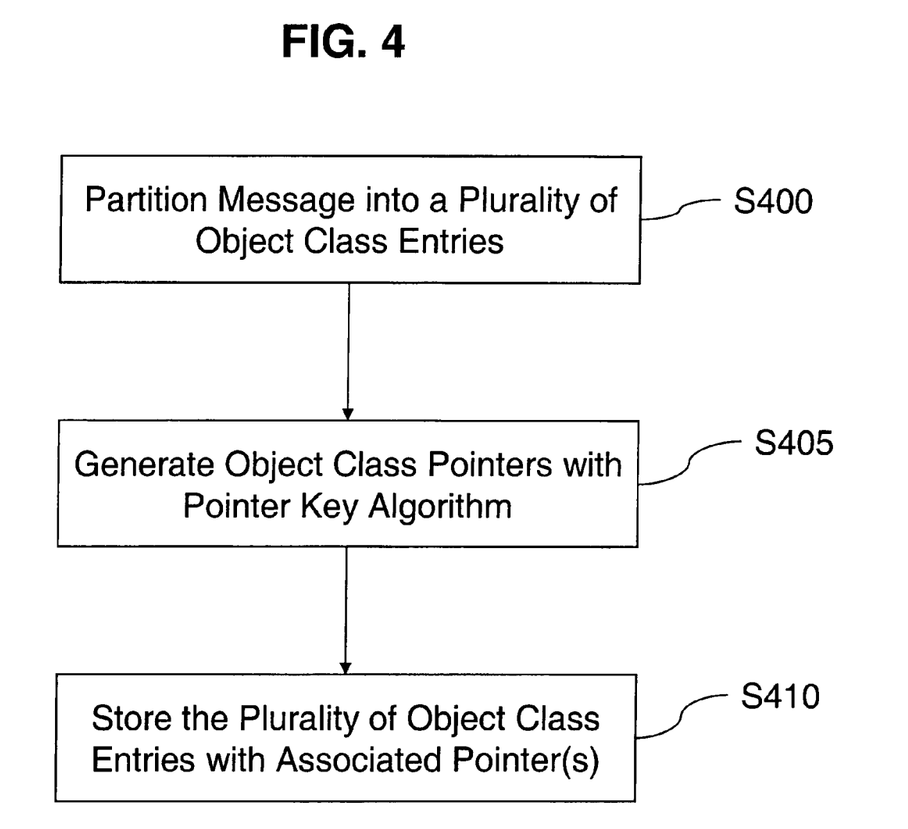
FIG. 4 illustrates a process of encapsulating information within an encapsulated database according to another example embodiment of the present invention.

FIG. 4 illustrates a process of encapsulating information within the encapsulated database 130 according to another example embodiment of the present invention.

In the example embodiment of FIG. 4, in step S400, the information storage request is partitioned into four (4) hierarchical object classes. While example embodiments of the present invention are hereinafter described as being directed to encapsulated databases configured for storing four object classes, it will be readily apparent that other example embodiments of the present invention may include any number of object classes. As discussed above, the four object classes, arranged from a highest position in the object class hierarchy to a lowest position in the object class hierarchy, are "Folder", "Form", "Topic" and "Data".

In an example, if the information storage request (from S300) is an Instant Message (IM) from Mike Rogers to Joe Smith, each working in an Accounting department in company X (which maintains the encapsulated database 130), including the message contents ("I am going to be 30 minutes late to the meeting"), the message is partitioned as shown in Table 1 (Below).

TABLE 1

| Object Class | Object Class Entry (Contents) |
|---|---|
| Folder | Company X: Accounting Dept. |
| Form | Joe Smith |
| Topic | Instant Message |
| Data | Mike Rogers: "I am going to be 30 minutes late to the meeting" |

It is appreciated that Table 1 illustrates a simplification of actual values stored in the object classes Folder, Form, Topic and Data. For example, the object class Data may further store a time stamp indicating a time that the Instant Message from Mike Rogers was received at the encapsulated database 130 in step S200 of FIG. 2, and/or other data fields. In another example, the Instant Message may be appended to a previous series of Instant Messages between Mike Rogers and Joe Smith, referred to as a "Conversation". Also, while not shown in Table 1, each of the entries within object classes Folder, Form, Topic and Data are stored with associated pointers, which will now be described in greater detail.

Accordingly, in step S405, the encapsulated database 130 executes a pointer key algorithm to generate object class identifications, or pointers, which are stored in association with the Form, Topic and Data object classes. Each pointer is used to identify an associated, higher-level object class.

Accordingly, in an example, a topic pointer, a form pointer and a folder pointer are generated. The topic pointer is stored in association with a data entry in the Data object class, the form pointer is stored in association with a topic entry in the Topic object class and a folder pointer is stored in association with a form entry in the Form object class.

In an example, the pointers generated in step S405 may be actual, physical addresses of the object class entries to which they point. Alternatively, in another example, the pointers generated in step S405 may be a variable which, through another execution of the pointer key algorithm, may be converted into the actual, physical address of the object class entries. By "encoding" the pointers in this manner, it will be appreciated that a hacker having access to the physical contents of the encapsulated database 130 is not able to simply access an object class Data entry and find the associated higher-level object classes (e.g., topic, form, folder, etc.) without the pointer key algorithm.

A detailed example will now be given describing the above pointer generation of step S405 of FIG. 4. The example provided below assumes a simplistic pointer key algorithm for the sake of facilitating understanding of example embodiments of the present invention. However, it is understood that more complex pointer key algorithms may be employed in other example embodiments of the present invention.

In the example pointer key algorithm, the pointers pointing to each of the topic, form and folder object class entries may be derived with the following Equation:

$$\text{Pointer} = [\text{Physical Address of Object Class Entry}] * 2 - 1 \quad \text{(Equation 1)}$$

As shown in Equation 1, the pointer key algorithm may be as simple as multiplying the physical address of the object class entry by 2 and then subtracting 1. An example execution of the pointer key algorithm will now be provided with respect to the example partitioned Instant Message of Table 1 (above). Assume that the object class Topic (e.g., "Instant Message"), Form (e.g., "Joe Smith") and Folder (e.g., "Accounting Dept.) entries of Table 1 already exist at physical addresses 46, 98 and 112, respectively (e.g., typical memory addresses will be higher and in a different and more complex format, but simplistic numbers are again used here for ease of description). The physical address at which the object class data entry is stored is not generated by the pointer key algorithm, but rather is simply a next available address in a queue reserved for object class data entries. The encapsulated database 130 maintains the next available address, and this address is assumed to be 144 for example purposes.

Applying the pointer key algorithm of Equation 1, the Topic object class entry pointer becomes 91, the Form object class entry pointer becomes 195 and the Folder object class entry pointer becomes 223. Once the pointers are obtained, Table 1 (above) may be expanded as shown below in Table 2.

TABLE 2

| | | Object Class Entry | | |
|---|---|---|---|---|
| Object Class | Contents | Stored Pointer | Object Class ID | Physical Address |
| Folder | Company X: Accounting Dept. | N/A | 223 | 112 |
| Form | Joe Smith | 223 | 195 | 98 |
| Topic | Instant Message | 195 | 91 | 46 |
| Data | Mike Rogers: "I am going to be 30 minutes late to the meeting" | 91 | N/A | 144 |

As shown in Table 2 (above), the pointers and object class entry identifications (IDs) are stored for the object classes Form and Topic, but not object classes Data and Folder. The object class Data includes a pointer to the object class topic entry because of the hierarchical object class arrangement. Thus, a "one-way" string of pointer is provided to enhance security such that a hacker cannot simply access a higher-level object class (e.g., folder, topic, form, etc.) and advance to associated lower-level object classes. Likewise, the object class Folder does not include a pointer because it is the highest-level object class, and as such there is no higher-level object class in which to point.

Also, while not shown in Table 2, it is understood that any lower-level object class entry (e.g., Form, Topic, Data, etc.) may include pointers to more than one higher-level object class entry (e.g., Folder, Form, Topic, etc.). For example, the object class Data entry shown in Table 2 may further include pointers to each of the object class Form and Folder entries, and as such is not necessarily limited to only storing the next-highest level object class Topic pointer.

Returning to FIG. 4, in step S410, the object class entries for object classes Data/Topic/Form/Folder are stored in their respective, assigned physical addresses (e.g., 46, 98, 112, 144, etc.) within the encapsulated database 130 along with their associated higher-level object class pointers.

Retrieving Information from an Encapsulated Database

Figure 5:
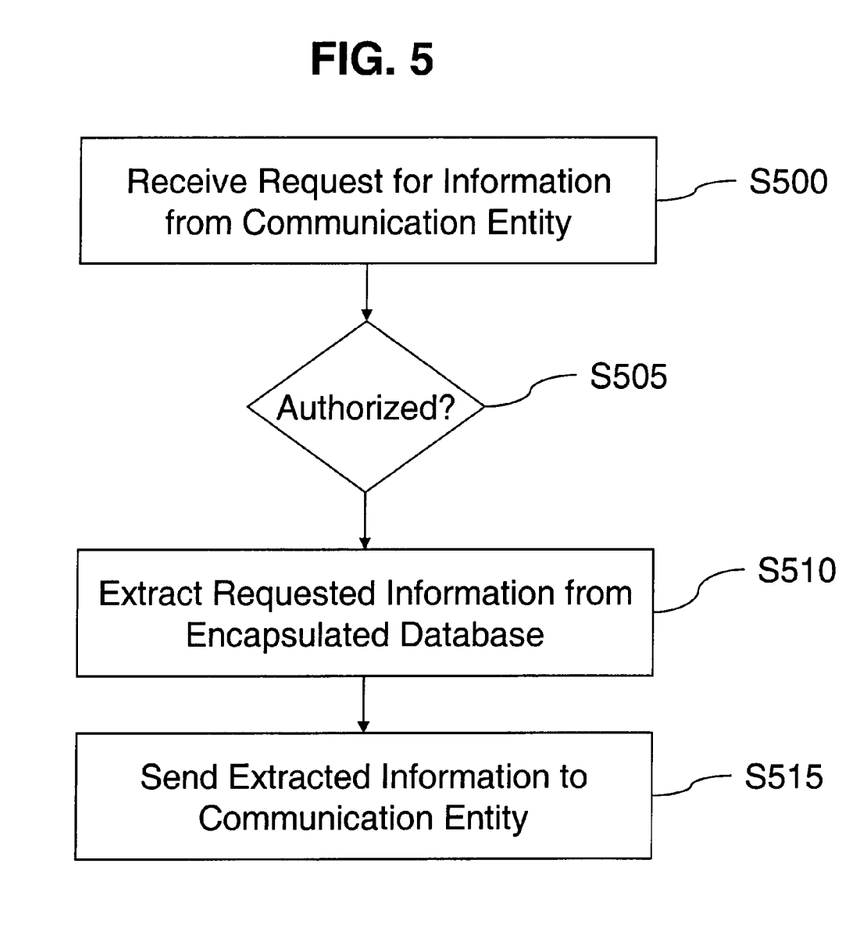
FIG. 5 illustrates a process for downloading information from the encapsulated database according to an example embodiment of the present invention.

An example of retrieving or downloading information stored in the encapsulated database 130 will now be described with reference to the system 100 of FIG. 1. FIG. 5 illustrates a process for downloading information from the encapsulated database 130 according to an example embodiment of the present invention.

In the example embodiment of FIG. 5, in step S500, the encapsulated database 130 receives a request for information from a communication entity (e.g., users 105/110, encapsulated database 135, etc.). Table 3 (below) illustrates an example set of possible information requests.

TABLE 3

| Request # | Information Request |
|---|---|
| 1 | If (First Name = "John") AND (Last Name = "Jones") THEN Return ALL; |
| 2 | If (Last Name = "Smith") OR (Last Name = "Jones") THEN LIST First Name, Last Name and Phone Number; |
| 3 | If (Last Name = "Smith") OR (Last Name = "Jones") THEN LIST Instant Message History; |

Table 3 (above) will be discussed in greater detail later with reference to step S510 and the process of FIG. 6.

In step S505 of FIG. 5, the encapsulated database 130 evaluates the communicate entity and the request for information (from S500) to determine whether the communication entity is authorized to access the object classes designated within the request for information. In an example, step S505 may be the performed in the same manner as step S205 of FIG. 2, which is described with respect to the authorization determination process of FIG. 3. However, communication entities do not necessarily have the same "read" or "download" privileges as "write" or "upload" privileges. For example, in most conventional database mediation systems, fewer users are granted privileges to write information than are granted privileges to read information, for security purposes. Accordingly, while step S505 is performed in the same manner as step S205 of FIG. 2, the results of the privilege check step S305 of FIG. 3 are not necessarily the same.

In step S505, if the communication entity is not authorized to access the requested information (e.g., as determined from the process of FIG. 3), the request for information (from S500) is ignored and no action is taken by the encapsulated database 130 (e.g., other than, possibly, informing the communication entity that the request for information has been denied). Otherwise, if the communication entity is determined to be authorized in step S505, the process advances to step S510. In step S510, the requested information is extracted from the encapsulated database 130, which will now be described in greater detail with respect to FIG. 6.

Figure 6:
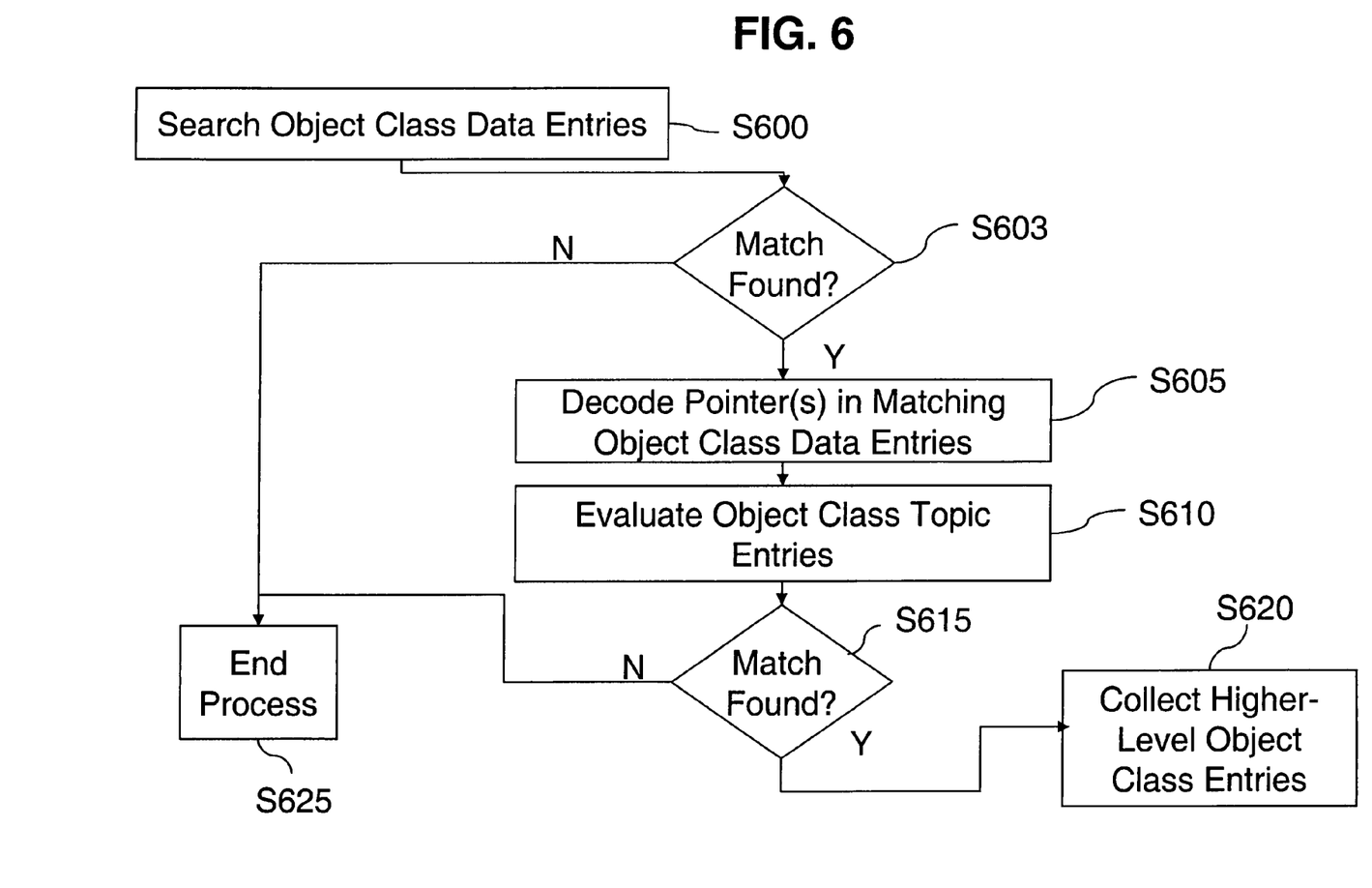
FIG. 6 illustrates a process of extracting information from the encapsulated database according to another example embodiment of the present invention.

FIG. 6 illustrates a process of extracting information from the encapsulated database 130 according to another example embodiment of the present invention.

In the example embodiment of FIG. 6, in step S600, the encapsulated database 130 searches all locally stored object class data entries (e.g., stored within the encapsulated database 130) for data fields (e.g., portions of the object class data entries) matching the information request (from S500). In step S603, the encapsulated database 130 evaluates the results of the searching step S600. If the searching step S600 attains a subset of object class Data entries with one or more data fields matching the search criteria, the process advances to step S605. Otherwise, if the searching step S600 finds no matches, the process of FIG. 6 terminates at step S625.

In step S605 of FIG. 6, the encapsulated database 130 decodes the object class topic pointers stored within each of the object class Data entries of the subset attain in step S600. In step S610, the encapsulated database 130 evaluates the object class topic entries pointed to by the decoded object class topic pointers (from step S605). In step S615, the encapsulated database 130 determines whether one or more of the object class topic entries (step S610) match one or more topics designated in the information request (from step S500). If no matches are found, the process terminates at step S625; otherwise, the process advances to step S620. In step S620, the encapsulated database decodes pointers to all remaining higher-level object class entries pointed to by the matching object class Topic entries.

Returning to the example embodiment of FIG. 5, in step S515, the encapsulated database 130 sends the extracted information (from step S510) to the communication entity. The extracted information includes all object class entries associated with the matching object class Topic entries of step S615 (e.g., including the object class Data entries (from step S603) pointing to the matching object class Topic entries, the matching object class Topic entries (from step S615) and the collected object class Form/Folder entries (from step S620).

Examples of the process of FIG. 6 will now be described with respect to Table 3 (above).

Request 1 of Table 3

In step S600 of FIG. 6, the encapsulated database 130 searches all locally stored object class data entries and returns a set of object class data entries with one or more data fields matching "John Smith". In step S603, assume that at least one matching object class Data entry is found, and the process advances to step S605. In step S605, all object class Topic pointers for the at least one matching object class Data entry are decoded. Then, in step S610, the encapsulated database 130 analyzes the object class Topic entries pointed to by the decoded object class Data pointers. In step S615, assume that included among the object class Topic entries pointed to by the decoded object class Topic pointers are "First Name" and "Last Name" object class Topic entries. Thus, step S615 advances to step S620, and the encapsulated database 130 collects the object class Form/Folder entries pointed to by the Data object's Form/Folder entries.

Request 2 of Table 3

In step S600 of FIG. 6, the encapsulated database 130 searches all locally stored object class data entries and returns a set of object class data entries with one or more data fields matching "Smith" or "Jones". In step S603, assume that at least one matching object class Data entry is found, and the process advances to step S605. In step S605, all object class Topic pointers for the at least one matching object class Data entry are decoded. Then, in step S610, the encapsulated database 130 analyzes the object class Topic entries pointed to by the decoded Data object class Topic pointers. In step S615, assume that included among the object class Topic entries pointed to by the decoded Data object class Topic pointers are "First Name" or "Last Name" object class Topic entries. Thus, step S615 advances to step S620, and the encapsulated database 130 collects the object class Form/Folder entries pointed to by the Data object's class Topic entries.

Figure 7:
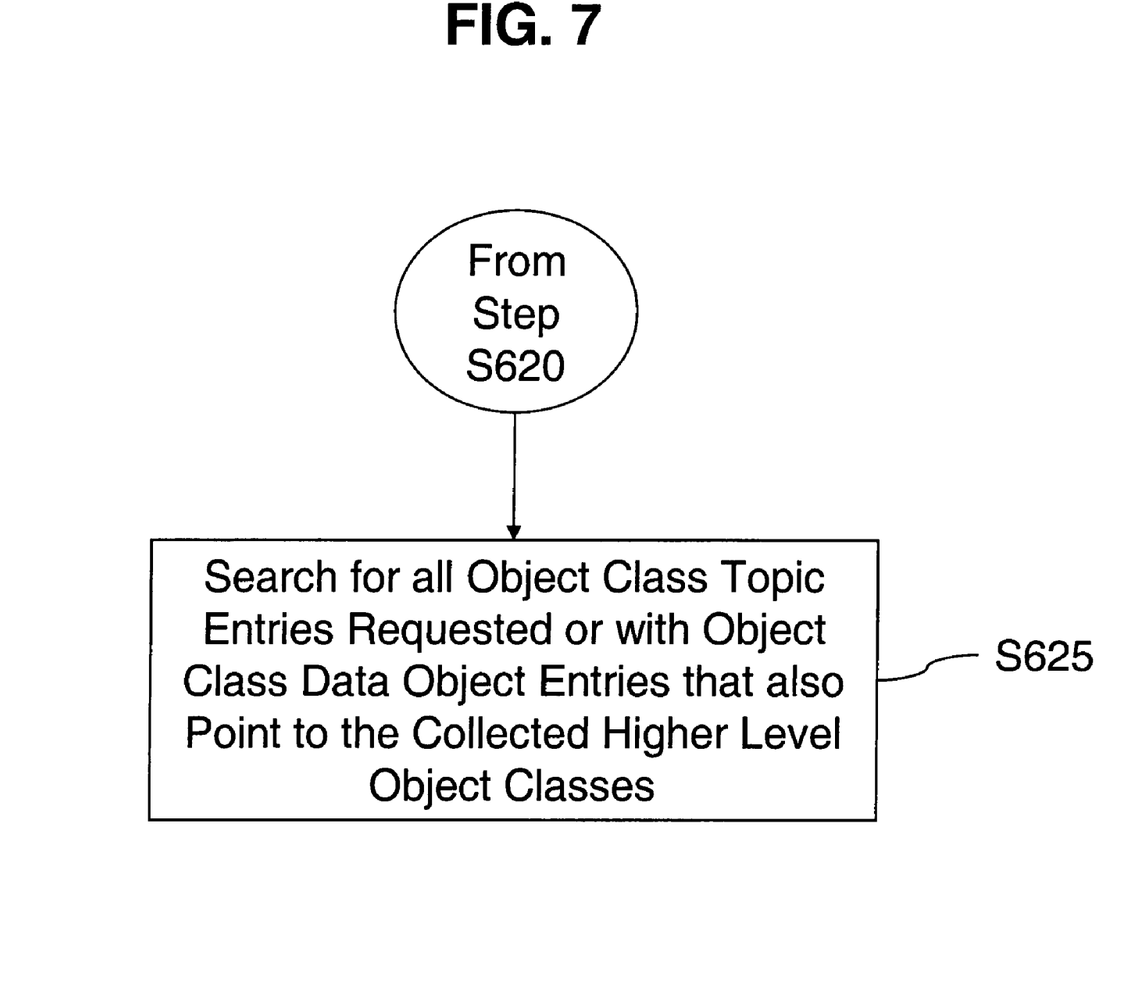
FIG. 7 illustrates an additional step of the process of FIG. 6 for performing a LIST command according to another example embodiment of the present invention.

Next, because Request 2 is a "LIST" command, an additional step is performed after step S620 of FIG. 6 before returning to step S515 of FIG. 5. FIG. 7 illustrates the additional step of the process of FIG. 6 for the LIST command according to another example embodiment of the present invention.

In step S625 of FIG. 7, the encapsulated database 130 searches for and collects all data objects that point to the "First Name", "Last Name" and "Phone Number" object class topic entries that also point to the object class Form and Folder entries collected in step S620 of FIG. 6. Then, after collecting the request object class topic entries requested for listing, the process advances to step S515 of FIG. 5 and sends, to the requesting communication entity, the following: the matching object class Data entries (from step S600), the matching object class Topic entries (from step S615), the collected object class Form and Folder entries (from step S620 of FIG. 6) and the collected object class data entries (from step S625).

Request 3 of Table 3

Request 3 of Table 3 is similar to Request 2 of Table 3, except that the object class Topic entry requested for listing is "Instant Message History". Accordingly, the execution of Request 3 of Table 3 is similar to the description above related to Request 2 of Table 3, except that instead of collecting "First Name", "Last Name" and "Phone Number" object class topic entries in step S625 of FIG. 7, all "Instant Message" object class data entries pointing to the object class Form/Folder entries collected in step S620 of FIG. 6 are collected.

It will be readily appreciated by one of ordinary skill in the art that numerous other types of query commands may be executed at the encapsulated database 130 during the process of FIGS. 6 and 7 other than "LIST", and as such a further description of such commands has been omitted for the sake of brevity.

Information Sharing Between Different Encapsulated Databases

Example embodiments of the present invention have been above-described as performed at a single encapsulated database (i.e., the encapsulated database 130). However, as shown in the system 100 of FIG. 1, numerous encapsulated databases 130/135 may be deployed. In another example embodiment of the present invention, each of the encapsulated databases 130/135 may be configured to have the same object class Topic entries. The object class topic entries are maintained uniform, or at least compatible, at each of the encapsulated databases 130/135 and across the system 100 such that pairing of Data Object Topic Object class entries, may be used to more easily obtain desired information from disparate databases. It will be appreciated that the remaining object classes Folder, Form and Data and standard record structures are more company-specific, user-specific and/or case-specific, respectively, and as such may vary within an encapsulated database (e.g., due to dissimilar usage) and from database to database (e.g., encapsulated or non-encapsulated).

For example, by defining "Instant Message" to be an object class Topic entry for all encapsulated databases 130/135 within the system 100, a query for Instant Messages for a given user may be greatly simplified. One of ordinary skill in the art will appreciate that, if a database were not configured to include a Data Object-Topic Object pairing as per encapsulation methods, it would become much more difficult for a database, or user, requesting information, to successfully obtain such information across different databases. For example, a query for Instant Message information without a Topic-Data object class pairing as per the encapsulation methodologies described herein may be much more generic, allowing users to search multiple record or form structures without having knowledge of a particular form or record structure.

The encapsulated databases 130/135 may communicate with each other using the same communication interface protocol (CIP). As one of ordinary skill in the art will appreciate, databases using different internal database protocols (e.g., Oracle, etc.) may communicate and share information with each other if the same CIP is used for external communications (e.g., with connected encapsulated databases). Accordingly, each of the encapsulated databases 130/135 may be configured to use the same CIP.

For example, the CIP may include an information request format (e.g., described above with respect to step S500 of FIG. 5) and/or an information storage request (e.g., described above with respect to step S200 of FIG. 2). Thus, by standardizing the CIP across all encapsulated databases, costly and relatively inefficient database format translation software need not be developed or implemented.

Encapsulated Database Mediation of User Messaging

Examples of user messaging mediated by the encapsulated databases 130 and 135 within the system 100 of FIG. 1 will now be described with respect to FIGS. 8 and 9.

Figure 8:
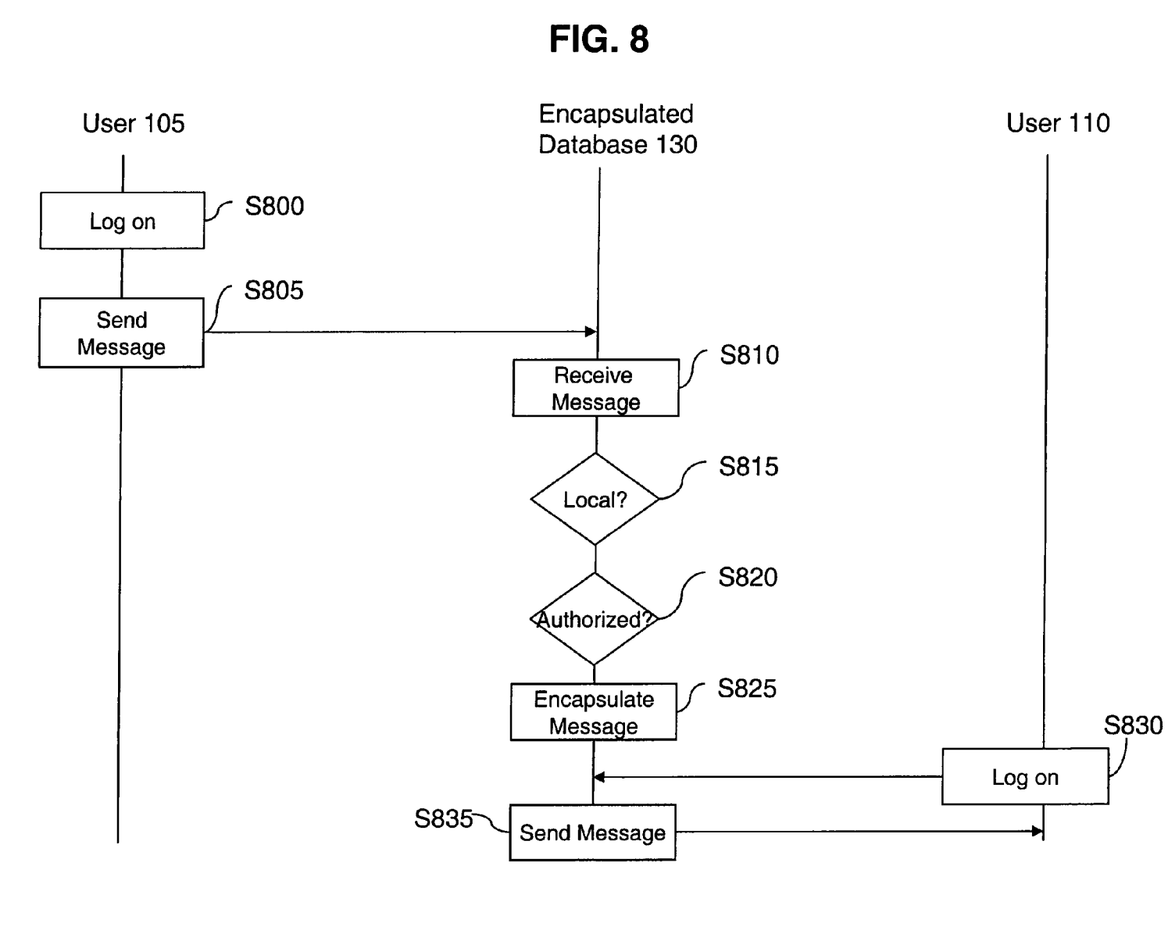
FIG. 8 illustrates an instant message process mediated by an encapsulated database according to an example embodiment of the present invention.

FIG. 8 illustrates an instant message process mediated by the encapsulated database 130 according to an example embodiment of the present invention. In step S800 of FIG. 8, the user 105 "logs onto" the encapsulated database 130. For example, the user 105 logs onto the encapsulated database 130 by authenticating itself (e.g., step S300 of FIG. 3). In the example process of FIG. 8, it may be assumed that the user 105 has a pre-existing account which is maintained by the encapsulated database 130, and that the user 105 wishes to send an instant message to the user 110.

Accordingly, in step S805 of FIG. 8, the user 105 configures an instant message in accordance with the common CIP (discussed above) for the encapsulated database 130, and sends the configured instant message to the encapsulated database 130. The encapsulated database receives the configured instant message in step S810. Step S810 is similar to step S200 of FIG. 2 because instant messaging mediated by encapsulated databases is, essentially, storing and disseminating information at one or more encapsulated database(s), with access to the stored information being limited to an intended recipient of the instant message.

In step S815, the encapsulated database 130 determines whether the intended recipient (i.e., user 110) of the received configured instant message has an account maintained locally at the encapsulated database 130. If the user 110 is determined to have a locally maintained account, the process advances to step S820. The process of mediating instant messages between different encapsulated databases is discussed in greater detail later with respect to FIG. 9.

In step S820 of FIG. 8, the encapsulated database 130 performs step S205 of FIG. 2, which is described in greater detail within the process of FIG. 3. In step S820, because the user 105 is already logged on (see step S800), the authentication step S300 need not be performed. Thus, the encapsulated database 130 ensures that the user 105 has sufficient privileges to send an instant message to the user 110 (e.g., see step S305 of FIG. 3). It will be assumed for the sake of description that the user 105 has sufficient privileges, and as such the process advances to step S825.

In step S825 of FIG. 8, the encapsulated database 130 encapsulates the instant message and stores the instant message in appropriate object class Folder/Form/Topic/Data entries for the user 110. The encapsulating step S825 has already been described above with respect to step S210 of FIG. 2 and the process outlined in FIG. 4, and as such will not be described further for the sake of brevity.

In step S830 of FIG. 8, the user 110 logs onto the encapsulated database 130 in the same manner as described above with respect to step S800. The encapsulated database 130 treats the logging on step S830 as an implicit request to receive any new instant messages sent to the user 110 since the user 110 had last logged onto the encapsulated database 130. Accordingly, in step S835, the encapsulated database 130 extracts the instant message and sends the instant message to the user 110 (e.g., along with any other "unread" instant messages). Encapsulated information extraction has been described above with respect to FIGS. 5 through 7 and will not be described further for the sake of brevity.

Also, while FIG. 8 illustrates an example where the user 110 logs onto the encapsulated database after the instant message is sent, in another example embodiment of the present invention, the user 110 may already be logged onto the encapsulated database 130 when the user 105 sends the message (at step S805). In this example, step S835 is performed after the encapsulating step S825 without first requiring the logging on step S830.

User Messaging Between Users Logged onto Different Encapsulated Databases

Figure 9:
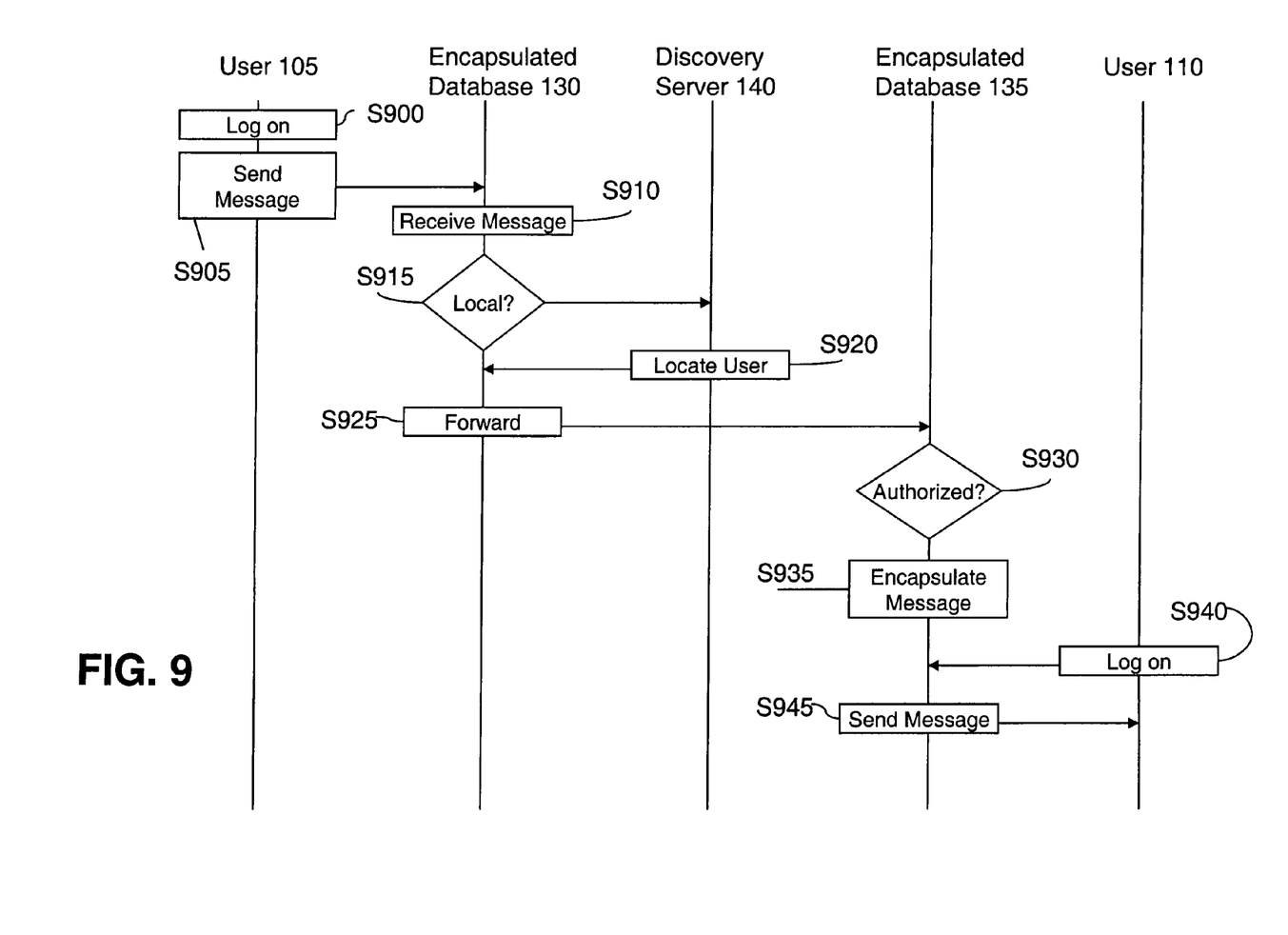
FIG. 9 illustrates an instant message process mediated by first and second encapsulated databases and a discovery server according to another example embodiment of the present invention.

FIG. 9 illustrates an instant message process mediated by the encapsulated databases 130 and 135 and the discovery server 140 according to another example embodiment of the present invention.

Steps S900 through S910 are performed in the same manner as described above with respect to steps S800 through S810 of FIG. 8, respectively, and will not be described further for the sake of brevity.

In step S915, the encapsulated database 130 determines whether the intended recipient (i.e., user 110) of the received configured instant message has an account maintained locally at the encapsulated database 130. Unlike step S815 of FIG. 8, step S915 of FIG. 9 determines that the user 110 does not have an account maintained locally at the encapsulated database 130, and the encapsulated database 130 requests an identification of the encapsulated database, to which the user 110 is assigned, from the discovery server 140.

The discovery server 140 maintains a list of user assignments to encapsulated databases throughout the system 100.

For example, when a user logs onto, or has an account maintained by, one or more of the encapsulated databases 130/135 within the system 100 of FIG. 1, the one or more encapsulated databases 130/135 reports the user location information to the discovery server 140 and the discovery server 140 adds the reported information to the list of user assignments stored therein.

Accordingly, in step S920 of FIG. 9, the discovery server 140 receives the request for a location of the user 110, searches the list of user assignments stored therein and reports the location of the user 110 to the encapsulated database 130. Within the description of the example embodiment of FIG. 9, it will be assumed that the location reported by the discovery server 140 in step S920 is the encapsulated database 140. Accordingly, in step S925 of FIG. 9, the encapsulated database 130 forwards the instant message (sent by the user 105 in step S905) to the encapsulated database 135.

In step S930 of FIG. 9, the encapsulated database 135 receives the forwarded instant message and performs step S205 of FIG. 2, which is described in greater detail within the process of FIG. 3. In step S930, because the user 105 is already logged (step S900), the authentication step S300 of FIG. 3 need not be performed. Thus, in step S930, the encapsulated database 135 verifies that the user 105 has sufficient privileges to send an instant message to the user 110 (e.g., see steps S305 and S310 of FIG. 3). It will be assumed for the sake of description that the user 105 has sufficient privileges, and as such the process advances to step S935.

In step S935 of FIG. 9, the encapsulated database 135 encapsulates the received, forwarded instant message and stores the instant message in appropriate object class Folder/Form/Topic/Data entries for the user 110. The encapsulating step S935 has already been described above with respect to step S210 of FIG. 2, the process of FIG. 4, and step S825 of FIG. 8, and as such will not be described further for the sake of brevity.

In step S940 of FIG. 9, the user 110 logs onto the encapsulated database 135 in the same manner as described above with respect to steps S800 and S830 of FIG. 8 and step S900 of FIG. 9. The encapsulated database 130 treats the logging on step S940 as an implicit request to receive any new instant messages sent to the user 110 since the user 110 had last logged onto the encapsulated database 135. Accordingly, in step S945, the encapsulated database 135 extracts the instant message and sends the instant message to the user 110. Encapsulated information extraction has been described above with respect to FIGS. 5 through 7 and will not be described further for the sake of brevity.

Also, while FIG. 9 illustrates an example where the user 110 logs onto the encapsulated database after the instant message is sent, in another example embodiment of the present invention, the user 110 may already be logged onto the encapsulated database 135 when the encapsulated database 130 forwards the instant message (at step S925). In this example, step S945 is performed after the encapsulating step S935 without first requiring the logging on step S940.

Security Features of the Encapsulated Database

As will now be described, the "encapsulated" database structure discussed above provides a level of "passive encryption", which protects data from malicious attacks by hackers. As discussed in the Background of the Invention section, conventional record storage typically stores all user-fields (e.g., First Name, Last Name, Data, etc.) in contiguous, memory addresses within a database.

In contrast, the encapsulated database 130/135 according to example embodiments of the present invention includes multiple hierarchical object classes, with lower-level object classes pointing to higher-level object classes without reciprocation. The different-level object classes are partitioned and stored together, such that information for a particular user is distributed throughout the encapsulated database 130/135.

Encapsulation in itself thus does not constitute encryption per se; rather, encapsulation is a passive type of security which is based on the way information (e.g., such as a message) is partitioned into object class fields for storage in corresponding tables (e.g., contiguous/adjacent storage location areas within an encapsulated database allocated to one of the object classes) which correspond to the specified object class. This passive security mechanism inherently acts as a type of encryption, although there is not necessarily a "randomness" in the manner that lower object classes are stored along with pointers to higher classes in the tables within encapsulated databases 130/135. In other words, the separation of object classes to different storage tables within the encapsulated database 130/135, which is a portion of the encapsulated addressing scheme described above, makes it much more difficult for a hacker to obtain relevant object class associations across the different object classes of the hierarchy.

Accordingly, in order to "unlock" or "make relevant" the data stored in an encapsulated database 130/135, a hacker must obtain object class entries in each object class of the object class hierarchy. The different object classes among the object class hierarchy are "linked" by pointers which are encoded with a pointer key algorithm only accessible at the encapsulated database 130/135. Thus, it will be appreciated that if, for example, a hacker simply stole all the hard drives from the encapsulated database 130/135, the hacker would not be able to understand the information stored therein without the pointer key algorithm.

Further, while the addressing and storage scheme of the encapsulated database 130/135 provides a certain level of "passive encryption" or "passive security", it is understood that additional levels of "active" encryption or security can be further employed within the encapsulated database 130/135. For example, the encapsulated database 130/135 may be encrypted with any well-known encryption protocol. In another example, the pointers stored in the lower-level object classes can be further encrypted to provide additional protection. Such active encryption techniques are well-known in the art and will not be discussed further for the sake of brevity.

Example embodiments of the present invention being thus described, it will be obvious that the same may be varied in many ways. For example, while above-described with respect to two (2) encapsulated databases 130/135 within the system 100, it is understood that other example embodiments of the present invention may scale to any number of encapsulated databases. Likewise, other example embodiments may be directed to different numbers or types of object classes, and not merely the four (4) object classes Folder, Form, Topic and Data. Such variations are not to be regarded as a departure from the example embodiments of the invention, and all such modifications are intended to be included within the scope of the invention.

I claim:

1. A method of encapsulating information in a database, comprising:
 partitioning a message into a plurality of object class entries within the database, each of the plurality of object class entries constituting a portion of an object class from a plurality of object classes having a given hierarchy within the database;

generating a single pointer to each of a first subset of the plurality of object class entries, the first subset including at least two object class entries therein, each generated pointer pointing to a different one of the plurality of object class entries; and storing the plurality of object class entries in non-adjacent storage locations within the database, with each of a second subset of the plurality of object class entries stored in association with one of the generated pointers such that each pointer points to a higher-level object class entry, as determined by the object class hierarchy, than the object class entry stored in association with each respective pointer, wherein the second subset is different from the first subset and includes at least two object class entries therein, wherein said partitioning further includes separating the message into a plurality of hierarchical object class entries in object classes related to an organization source of the message, the sender of the message, the type of message sent, and the content within the message, wherein the hierarchical order of object class from highest to lowest is organization, sender, type of message and content, and object class entries stored in the sender, type of message and content object classes include the generated pointers which point to the corresponding next-higher object classes organization, sender and type of message.

2. The method of claim 1, further comprising receiving an information storage request from a communication entity in a communication system requesting to either store the message in a given storage location within the database, or to retrieve a stored message from the database.

3. The method of claim 2, further comprising authorizing the communication entity and information storage request prior to commencing the partitioning of the message within the database or prior to commencing a retrieval of a stored message.

4. The method of claim 3, wherein authorizing includes:
authenticating the communication entity, and
determining whether the communication entity has required privileges to store information in the requested storage location or extract information from a given storage location, else
ignoring the information storage request if the communication entity is not authorized or does not have the required privileges.

5. The method of claim 1, wherein there are N object class entries and N-1 pointers.

6. The method of claim 5, wherein generating the single pointer to each of the first subset of object class entries includes executing a pointer key algorithm to generate the N-1 pointers stored in association with N-1 object class entries of the second subset and configured to identify an associated, higher-level object class entry of the first subset.

7. The method of claim 1, wherein a given pointer only points in the direction of one or more higher-level object class entries than the given object class entry stored in association with the given pointer within the database.

8. The method of claim 1, wherein the first subset includes each of the plurality of object class entries except a lowest-level object class entry, as determined by the object class hierarchy.

9. The method of claim 1, wherein the second subset includes each of the plurality of object class entries except a highest-level object class entry, as determined by the object class hierarchy.

10. An encapsulated database for use in a communication system, comprising:
a plurality of object class entries corresponding to given fields in a received message received from a given communication entity in the system, the message having been partitioned so that fields are dedicated to corresponding object class entries, each object class entry constituting a portion of a given object class of a plurality of object classes having a given object class hierarchy;
a plurality of pointers, each for pointing to a different one of a first subset of the object class entries, the first subset including at least two object class entries therein; and
a plurality of storage locations, in which each of the plurality of object class entries corresponding to the fields of the message are stored in non-adjacent storage locations, with each of a second subset of the object class entries stored in association with one of the plurality of pointers such that each pointer points to a higher-level object class entry, as determined by the object class hierarchy, than the object class entry stored in association with each respective pointer, wherein the second subset is different than the first subset and includes at least two object class entries therein, wherein
the message is separated into a plurality of hierarchical object class entries of object classes related to an organization source of the message, a sender of the message, a type of message sent, and content within the message, the hierarchical order of object class from highest to lowest is organization, sender, type of message and content, and
the object class entries stored in the sender, type of message and content object classes include the pointers which point to the corresponding next-higher object classes organization, sender and type of message.

11. The database of claim 10, wherein there are N object class entries and N-1 pointers.

12. The database of claim 11, wherein the database executes a pointer key algorithm to generate the N-1 pointers stored in association with N-1 object class entries of the second subset and configured to identify an associated, higher-level object class of the first subset.

13. The database of claim 10, wherein a given pointer only points in the direction of one or more higher-level object class entries than the given object class entry stored in association with the given pointer within the database.

14. A communication system, comprising:
a plurality of users,
a plurality of encapsulated databases, each encapsulated database configured as recited in claim 10,
a discovery server to maintain encapsulated database associations for all users logged onto one of the encapsulated databases,
each of the users, encapsulated databases and discovery server being connected or accessible to each other via the internet, and
each of the encapsulated databases using the same communication interface protocol for at least external communication so as to communicate and share information with each other.

15. The communication system of claim 14, wherein each of the plurality of encapsulated databases include a first object class related to content and a second object class identifying a type of content, the first object class being a lower level object class as compared to the second object class and pointing to the second object class, the types of content identified by the second object class being the same at each of the plurality of encapsulated databases.

16. The database of claim 10, wherein the second subset includes each of the plurality of object class entries except a highest-level object class entry, as determined by the object class hierarchy.

17. The database of claim 10, wherein the first subset includes each of the plurality of object class entries except a lowest-level object class entry, as determined by the object class hierarchy.

* * * * *